United States Patent
Komatsu et al.

(10) Patent No.: US 10,942,431 B2
(45) Date of Patent: Mar. 9, 2021

(54) VIRTUAL IMAGE DISPLAY APPARATUS

(71) Applicant: SEIKO EPSON CORPORATION, Tokyo (JP)

(72) Inventors: Akira Komatsu, Kamiina-gun (JP); Masayuki Takagi, Azumino (JP); Toshiaki Miyao, Matsumoto (JP); Takashi Takeda, Suwa (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 95 days.

(21) Appl. No.: 16/375,934

(22) Filed: Apr. 5, 2019

(65) Prior Publication Data
US 2019/0310543 A1  Oct. 10, 2019

(30) Foreign Application Priority Data
Apr. 6, 2018 (JP) .............................. JP2018-073667

(51) Int. Cl.
| | |
|---|---|
| G03B 21/20 | (2006.01) |
| G02B 5/02 | (2006.01) |
| G06F 3/01 | (2006.01) |
| G06K 9/00 | (2006.01) |

(52) U.S. Cl.
CPC ....... *G03B 21/2033* (2013.01); *G02B 5/0273* (2013.01); *G06F 3/013* (2013.01); *G06K 9/0061* (2013.01)

(58) Field of Classification Search
CPC .......... G03B 21/20; G03B 35/18; G02B 5/02; G02B 26/10; G02B 27/00; G02B 27/01; G06K 9/00; G06K 9/20; G06F 3/01
See application file for complete search history.

(56) References Cited

U.S. PATENT DOCUMENTS

| | | |
|---|---|---|
| 2007/0171370 A1 | 7/2007 | Watanabe |
| 2016/0161755 A1 | 6/2016 | Yonekubo et al. |
| 2017/0276957 A1 | 9/2017 | Matsuki et al. |

FOREIGN PATENT DOCUMENTS

| | | | |
|---|---|---|---|
| JP | 2002-318365 | A | 10/2002 |
| JP | 2004-157173 | A | 6/2004 |
| JP | 2006-098570 | A | 4/2006 |
| JP | 2014-224994 | A | 12/2014 |
| JP | 2014224994 | A * | 12/2014 |
| JP | 2016-109923 | A | 6/2016 |
| JP | 2017-173486 | A | 9/2017 |

* cited by examiner

*Primary Examiner* — Michelle M Iacoletti
*Assistant Examiner* — Danell L Owens
(74) *Attorney, Agent, or Firm* — Oliff PLC (57) ABSTRACT

Provided is a virtual image display apparatus including a laser light source, a scanner configured to scan light from the laser light source and render an intermediate image, a diffusion element arranged at a position of the intermediate image formed by the scanner, and an exit pupil forming unit configured to cause light that has passed through the diffusion element to be incident on a position of an exit pupil. The diffusion element separates the light from the scanner into first emission light used as a reference, and second emission light having a separation angle greater than a capturing angle corresponding to an inclination of light toward a predetermined pupil radius relative to the first emission light at an emission position of the light from the diffusion element, and then emits the first emission light and the second emission light.

7 Claims, 10 Drawing Sheets

VIRTUAL IMAGE DISPLAY APPARATUS

The present application is based on, and claims priority from JP Application Serial Number 2018-073667, filed Apr. 6, 2018, the disclosure of which is hereby incorporated by reference herein in its entirety.

BACKGROUND

1. Technical Field

The disclosure relates to a retinal scanning type virtual image display apparatus such as a head-mounted display.

2. Related Art

Such retinal scanning type virtual image display apparatuses are present that are each arranged with a diffraction element at a position offset from a surface of an intermediate image formed by a scanning optical system. In such a virtual image display apparatus, in order to expand an exit pupil, a diffraction element is used to separate an original beam into three beams, an arrangement of the diffraction element is adjusted to achieve a state where three exit pupils are adjacent to and overlap with each other, and the three beams are allowed to enter into a pupil (FIGS. 6 and 8, for example, in JP-A-2006-98570).

However, in the virtual image display apparatus in JP-A-2006-98570, three beams entering into a pupil causes a beam cross-section to expand, blurring a Maxwellian view. As a result, a benefit of retinal scanning, which is suppressing of an image from blurring regardless of whether eyes of an observer have abnormality, cannot be achieved.

SUMMARY

A virtual image display apparatus according to the disclosure includes a laser light source, a scanner configured to scan light from the laser light source and form an intermediate image, a diffusion element arranged at a position of the intermediate image formed by the scanner, and an exit pupil forming unit configured to cause light that has passed through the diffusion element to be incident on a position of an exit pupil. The diffusion element separates light from the scanner into first emission light used as a reference, and second emission light having a separation angle greater than a capturing angle corresponding to an inclination of light toward a predetermined pupil radius relative to the first emission light at an emission position of the light from the diffusion element, and then emits the first emission light and the second emission light. The predetermined pupil radius used herein is assumed based on a standard eye pupil, and specifically is 1.5 mm, for example, as premises for observing an image at standard brightness.

With the virtual image display apparatus described above, since the diffusion element separates light from the scanner into the first emission light used as a reference, and the second emission light having a separation angle greater than a capturing angle corresponding to an inclination of light toward the predetermined pupil radius relative to the first emission light at the emission position of the light from the diffusion element, and then emits the first emission light and the second emission light, the first emission light and the second emission light are prevented from entering into a pupil. At the same time, even when a direction of an eye is greatly changed to an extent that original emission light is emitted toward the outside of the pupil, allowing either of the first emission light and the second emission light to enter into the pupil can be easily ensured.

DESCRIPTION OF EXEMPLARY EMBODIMENTS

First Exemplary Embodiment

Figure 1:
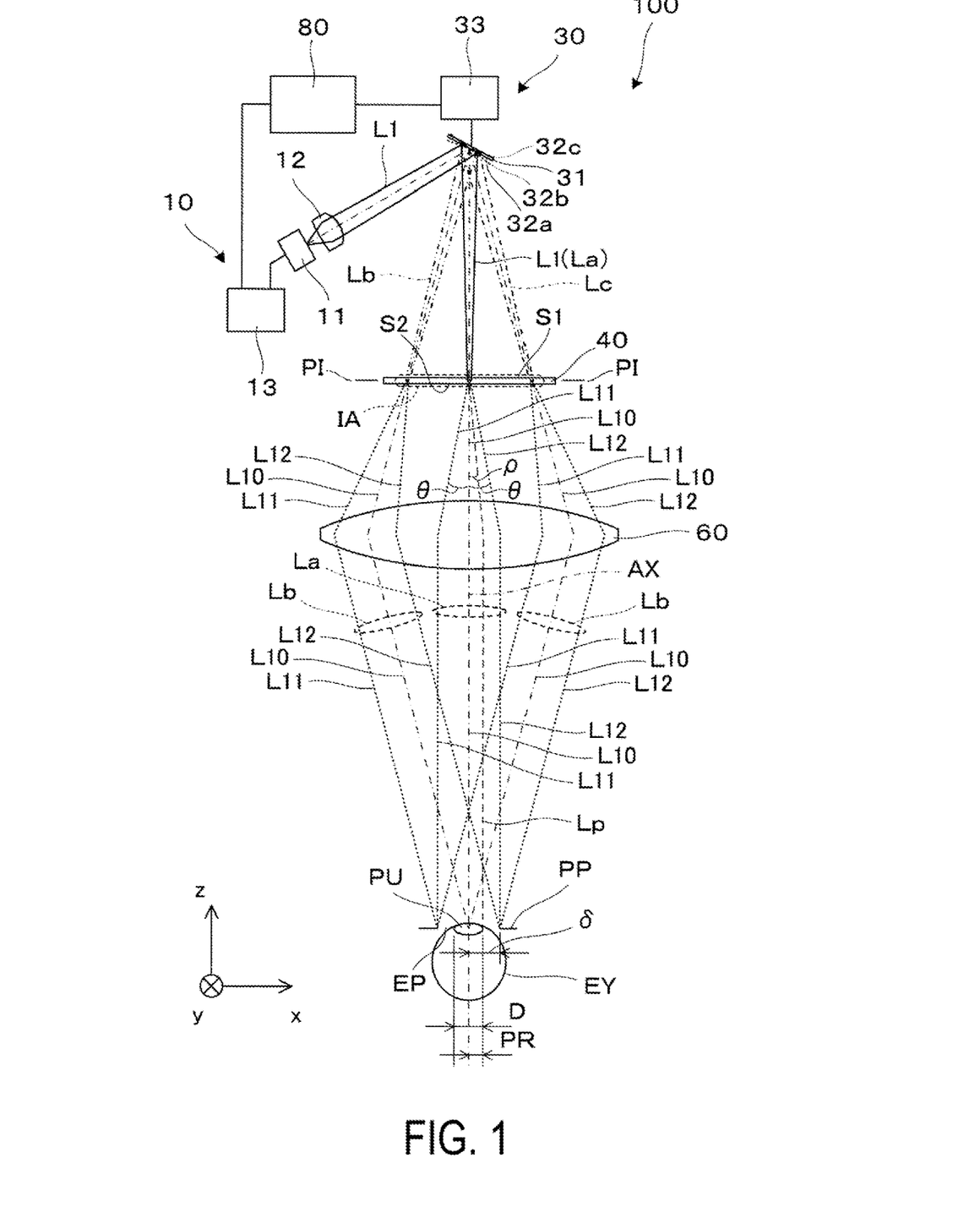
FIG. 1 is a schematic cross-sectional view illustrating a virtual image display apparatus according to a first exemplary embodiment.

FIG. 1 is a view schematically illustrating a structure of a virtual image display apparatus 100 according to a first exemplary embodiment. The virtual image display apparatus 100 includes a light source unit 10, a scanner 30, a diffusion element 40, an imagery optical system 60, and a controller 80.

The light source unit 10 includes a laser light source 11 such as a laser diode (LD; semiconductor laser), a beam forming lens 12 configured to convert light emitted from the laser light source 11 into substantially parallel light, i.e., a beam L1, and a light source driver 13 configured to drive the laser light source 11. The light source unit 10 is not limited to a light source unit including the laser light source 11 serving as a single laser light source, but may be a light source unit including three LDs corresponding to three colors of RGB, for example. In this case, for example, beam forming lenses are provided for the LDs corresponding to the colors, and the beam L1 substantially paralleled from lights from the LDs corresponding to the colors is allowed to enter into a scanning mirror 31, described later. The laser light source 11 operates under control of the light source driver 13 and emits light modulated based on image data.

The scanner 30 includes the scanning mirror 31 configured to scan in a two-dimensional manner the beam L1 from the light source unit 10, and a mirror driver 33 configured to adjust a posture of the scanning mirror 31. The scanning mirror 31 uses Micro Electro Mechanical Systems (MEMS), for example. When the scanning mirror 31 is at a reference position, a basic beam La reflected by a reflective surface 32a corresponding to the reference position is emitted along an optical axis AX. When the scanning mirror 31 is at an inclined position, beams Lb and Lc reflected by inclined reflective surfaces 32b and 32c are emitted at a predetermined deflection angle in a direction off the optical axis AX. The scanning mirror 31 is not limited to a two-dimensional scan type, but may achieve scanning in a two-dimensional manner with two, one-dimensional scan type scanning mirrors combined with each other. The scanner 30 scans in a two-dimensional manner with the scanning mirror 31 the beam L1 irradiated from the light source unit 10 to form an intermediate image IA at or in the vicinity of a position of the diffusion element 40 described later.

The diffusion element 40 is a flat plate member and arranged at or adjacent to an intermediate image position PI determined by an optical system of the light source unit 10 and the scanner 30. The diffusion element 40 has a periodic structure, described later in detail, and is configured to separate the beam L1 from the scanner 30 into first emission light L10 used as a reference, and a pair of second emission lights L11 and L12 each forming a separation angle $\theta$ relative to the first emission light L10, and then emit the first emission light L10 and the second emission lights L11 and L12. The separation angle $\theta$ used herein is greater than a capturing angle $\rho$ corresponding to an inclination of light Lp toward a predetermined pupil radius PR relative to the first emission light L10 at an emission position of light from the diffusion element 40. The pupil radius PR is 1.5 mm, for example, as premises for observing an image at standard brightness. The pupil radius PR can be appropriately adjusted by taking into account use conditions and purposes, for example. Specifically, in accordance with a pupil diameter changing within a range from 3 mm when brighter to 7 mm when darker, an adjustment can be made within a range from 1.5 mm to 3.5 mm inclusive, for example. The beam L1 emitted from the scanner 30 forms the intermediate image IA at the intermediate image position PI representing a position most focused by the beam forming lens 12. If the diffusion element 40 is not present, the beam L1 passed through the intermediate image position PI slightly expands with a number of openings identical to a number of openings at a smaller convergent angle of the beam L1. The convergent angle of the beam L1 corresponds to a divergence angle of the first emission light L10, and is approximately 3°, for example, depending on a specification of the virtual image display apparatus 100.

The imagery optical system 60 is a convex lens having positive power and arranged away at a focal distance F from the diffusion element 40. The imagery optical system 60 functions as an exit pupil forming unit or a display optical system configured to allow the beam L1 passed through the diffusion element 40 to be incident on a position PP of an exit pupil EP. On an imagery side of the imagery optical system 60, the position PP of the exit pupil EP is set away at a distance 2F from the imagery optical system 60. When an eye EY is at the position PP of the exit pupil, an observer can observe a virtual image formed by the virtual image display apparatus 100. At the position PP of the exit pupil, a half value $\delta$ of an interval between the second emission lights L11 and L12 or an interval between the first emission light L10 and the second emission light L11 is increased greater to provide a margin than the pupil radius PR of a pupil UP. In other words, the half value $\delta$ of a width between the second emission lights L11 and L12 is increased greater to provide a margin than a distance from the optical axis AX at an incident position of the light Lp into the exit pupil EP. Therefore, the first emission light L10 and the second emission lights L11 and L12 can be prevented from entering simultaneously into the pupil UP. At the same time, even when the eye EY moves, either of the first emission light L10 and the second emission lights L11 and L12 enters into the eye EY, allowing capturing of a virtual image. The diffusion element 40 is arranged away at the focal distance F toward a light source side from the scanning mirror 31. With the diffusion element 40 arranged at a focal point position in front of the imagery optical system 60 serving as an exit pupil forming unit, the emission lights L10, L11, and L12 divided by a first periodic structure 41 of the diffusion element 40 are allowed to enter as beams parallel to each other at the exit pupil position PP.

The imagery optical system 60 is not limited to a system including a single lens, as illustrated, but may be a system including a plurality of lenses combined with each other, for example.

The controller 80 is communicably coupled with the light source driver 13 of the light source unit 10 and the mirror driver 33 of the scanner 30, governs how the light source unit 10 and the scanner 30 operate, and causes the virtual image display apparatus 100 to achieve a display operation of a virtual image.

Figure 2A:
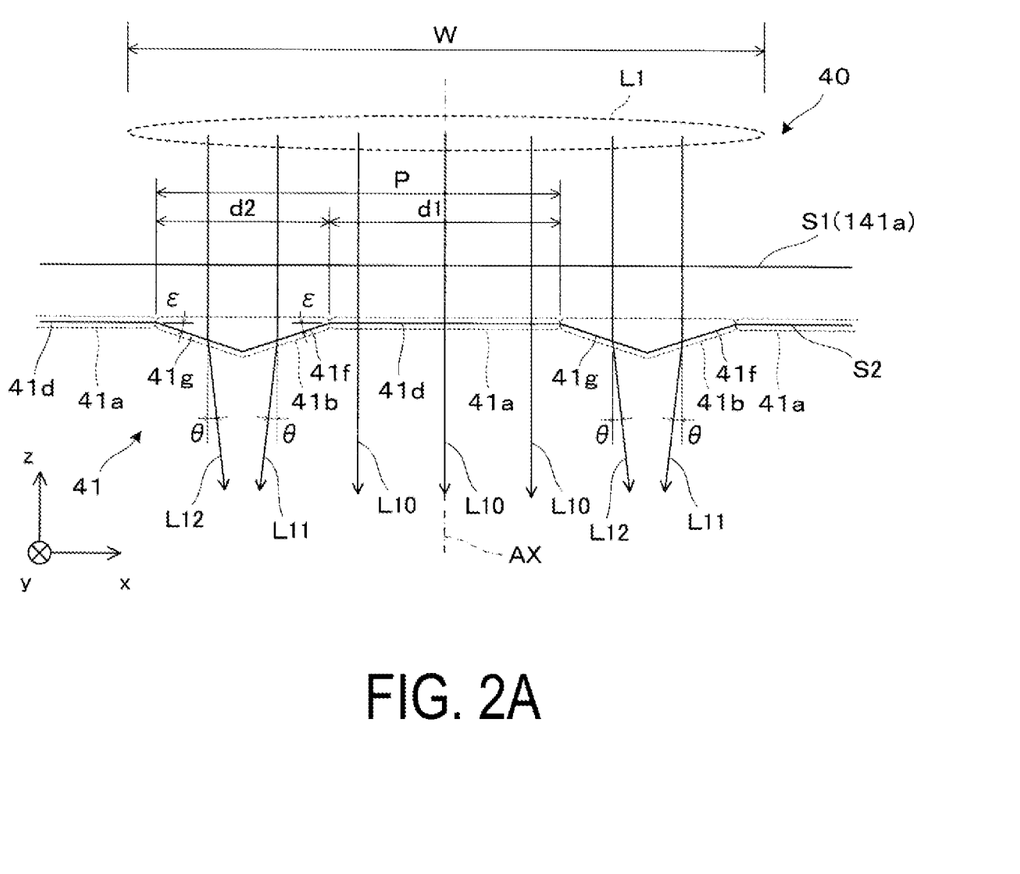
FIG. 2A is a partially enlarged cross-sectional view of a diffusion element.

As illustrated in FIG. 2A, the first periodic structure 41 is formed on an emission side, i.e., a second face S2, of the diffusion element 40. The first periodic structure 41 includes flat portions 41a and inclined portions 41b. The flat portions 41a respectively have flat surfaces 41d that extend substantially parallel to the optical axis AX, and are configured to allow the beam L1 passed through flat portions 141a, described later, to go straight ahead to form the first emission light L10. The flat surfaces 41d extend along the intermediate image position PI in the first periodic structure 41 and serve as first surfaces configured to form the first emission light L10. The inclined portions 41b respectively have pairs of inclined surfaces 41f and 41g each forming a predetermined inclination angle $\varepsilon$ relative to the optical axis AX and allow the beam L1 passed trough the flat portions 141a, described later, to refract in an x direction to form the pair of discrete second emission lights L11 and L12 divided in a ±x direction. The state is retained at the position of the exit pupil EP. The inclined surfaces 41f and 41g serve as second surfaces each inclined at a predetermined angle or greater relative to the flat surfaces 41d serving as the first surfaces, and are configured to form the second emission lights L11 and L12. As for the separation angle $\theta$ of the second emission lights L11 and L12, when a refractive index of the diffusion element 40 is designated as n, a relationship of $\sin(\theta+\varepsilon)=n\times\sin(\varepsilon)$ is satisfied. By appropriately adjusting the values n and $\varepsilon$, the separation angle $\theta$ can be set to a desired value.

As for the separation angle $\theta$ of each of the second emission lights L11 and L12 relative to the first emission light L10, when a pupil diameter of the pupil PU is designated as D, and a focal distance of the imagery optical system 60 serving as an exit pupil forming unit is designate as F, the following relationship is satisfied:

$$0.6D < F \tan \theta < 1.2D \quad (1).$$

The pupil diameter D corresponds to the standard pupil PU of the eye EY or a standard diameter of a pupil, and is set to 3 mm, for example. When $F \tan \theta = PR$, i.e., $F \tan \theta = 0.5D$, the second emission lights L11 and L12 enter at edges of the pupil PU. By setting $F \tan \theta$ to a value closer to 0.6D, such a possibility that, when the observer moves the eye EY from the center to the left or right, the first emission light L10 and the second emission light L11 do not enter into the pupil PU can be reduced, preventing an image from being interrupted, for example. On the other hand, by setting F tan θ to a value closer to 1.2D, such an event that, while the first emission light L10 is incident at a center of the pupil PU, the second emission lights L11 and L12 enter at the edges of the pupil PU can be fully avoided.

Figure 2B:
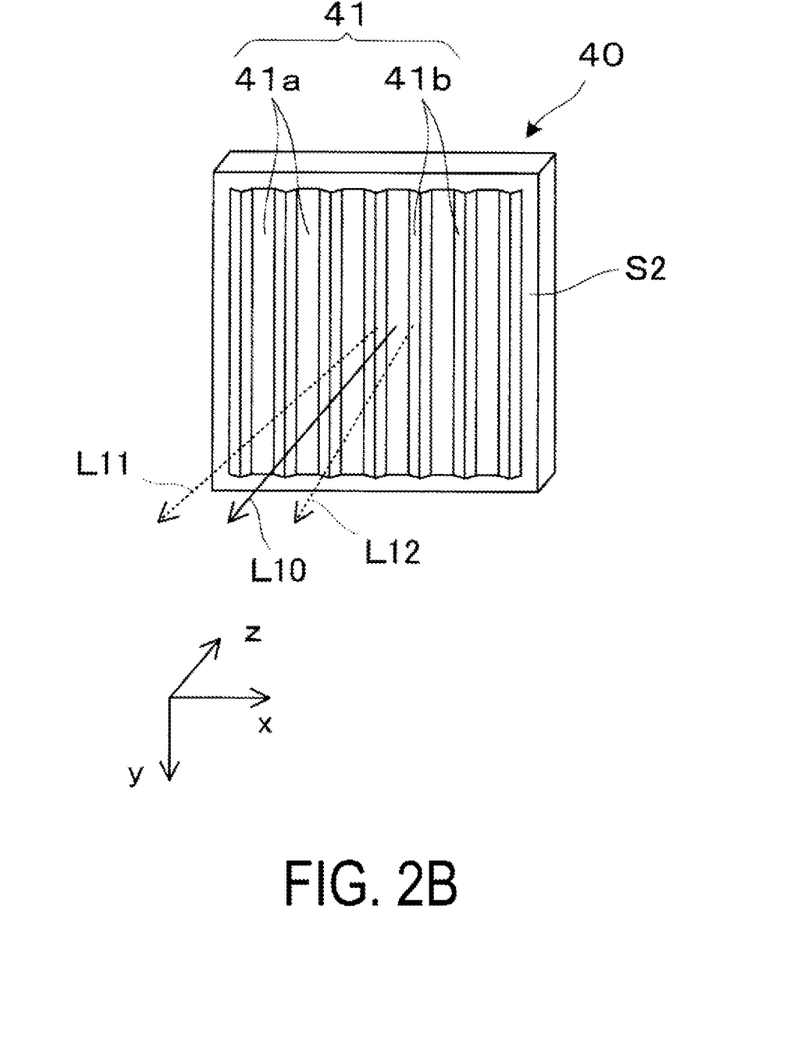
FIG. 2B is a perspective view of the diffusion element viewed from a second face.

FIG. 2B is a conceptual diagram illustrating a state of the second face S2 of the diffusion element 40. The first periodic structure 41 is alternately formed with the flat portions 41a and the inclined portions 41b. The flat portions 41a and the inclined portions 41b extend in a vertical y direction, and periodically arrayed in the horizontal x direction.

Returning to FIG. 2A, when a horizontal width of each of the flat portions 41a is designated as d1, a horizontal width of each of the inclined portions 41b as d2, and a pitch of the first periodic structure 41 as P, P=d1+d2 is satisfied. When a diameter of the beam L1 entering into the diffusion element 40, i.e., a horizontal width in the x direction of the beam L1, is designated as W, the pitch P of the first periodic structure 41 satisfies the following relationship:

$$P<0.5W \qquad (2).$$

Therefore, the beam L1 can enter into a region including at least two or more of the flat portions 41a and the inclined portions 41b, suppressing a fluctuation in light quantity balance between the first emission light L10 and the second emission lights L11 and L12.

Figure 2C:
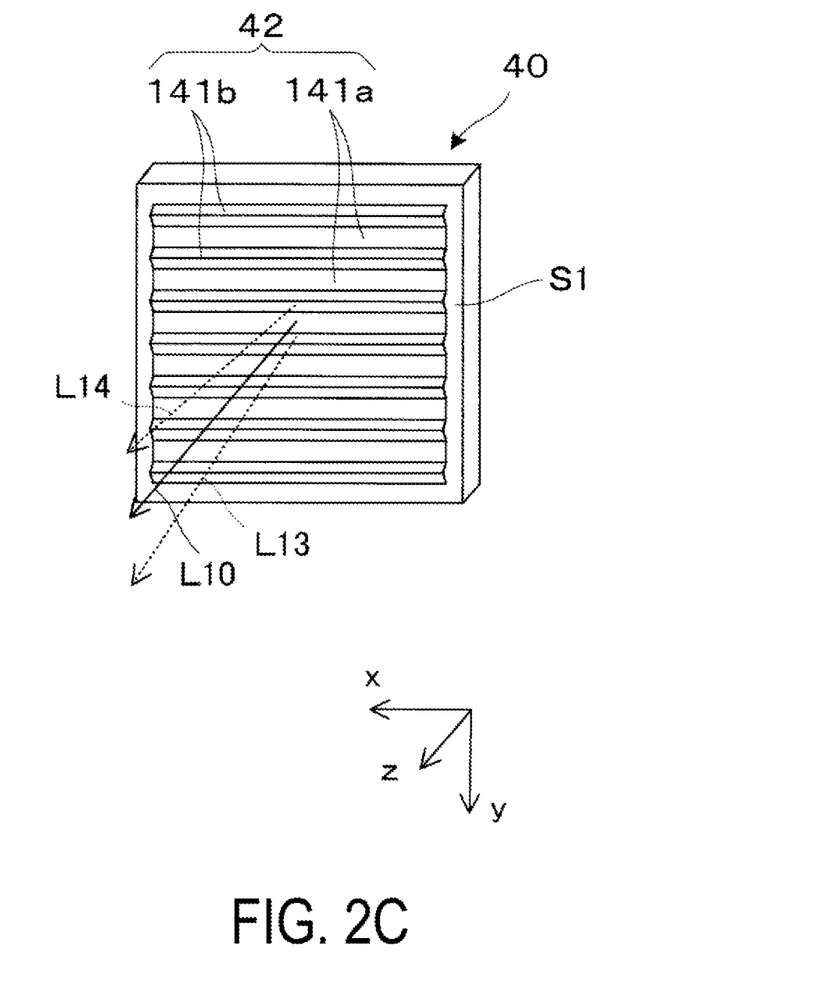
FIG. 2C is a perspective view of the diffusion element viewed from a first face.

FIG. 2C is a conceptual diagram illustrating a state of the first face S1 on an incident side of the diffusion element 40. A second periodic structure 42 is formed on the first face S1 of the diffusion element 40. The second periodic structure 42 includes the flat portions 141a and inclined portions 141b. The flat portions 141a are similar in shape to the flat portions 41a illustrated in FIG. 2A. When the beam L1 is allowed to go straight ahead through the flat portions 141a and then through the flat portions 41a in the first periodic structure 41, the first emission light L10 is formed. The inclined portions 141b are similar in shape to the inclined portions 41b illustrated in FIG. 2A. However, a shape arrangement direction differs, causing the beam L1 to refract in a ±y direction. When a beam is allowed to go straight ahead through the flat portions 41a in the first periodic structure 41, the inclined portions 141b form a pair of discrete second emission lights L13 and L14 divided in the vertical y direction. The state is retained at the position of the exit pupil EP. When a diameter (i.e., a vertical width in the y direction) of the beam L1 entering into the diffusion element 40 is designated as W, the pitch P of the second periodic structure 42 also satisfies the following relationship:

$$P<0.5W \qquad (2).$$

Although a case when the beam L1 passes through the inclined portions 41b of the first periodic structure 41 and the inclined portions 141b of the second periodic structure 42 is not described above, this case forms from the original beam L1 a pair of second emission lights (not illustrated) divided diagonally in +x and +y or in −x and −y, and a pair of second emission lights (not illustrated) divided diagonally in +x and −y or in −x and +y.

Although FIG. 2A illustrates the beam La derived from the beam L1, which enters into an area around the optical axis AX, the beams Lb and Lc entering into an area around the diffusion element 40 away from the optical axis AX are also divided into first emission light parallel to the original beams Lb and Lc, and two or more pairs of second emission lights forming the separation angle θ in the x direction and/or the y direction relative to the original beams Lb and Lc.

A role and a function of the diffusion element 40 will be specifically described with reference to FIG. 3.

Figure 3:
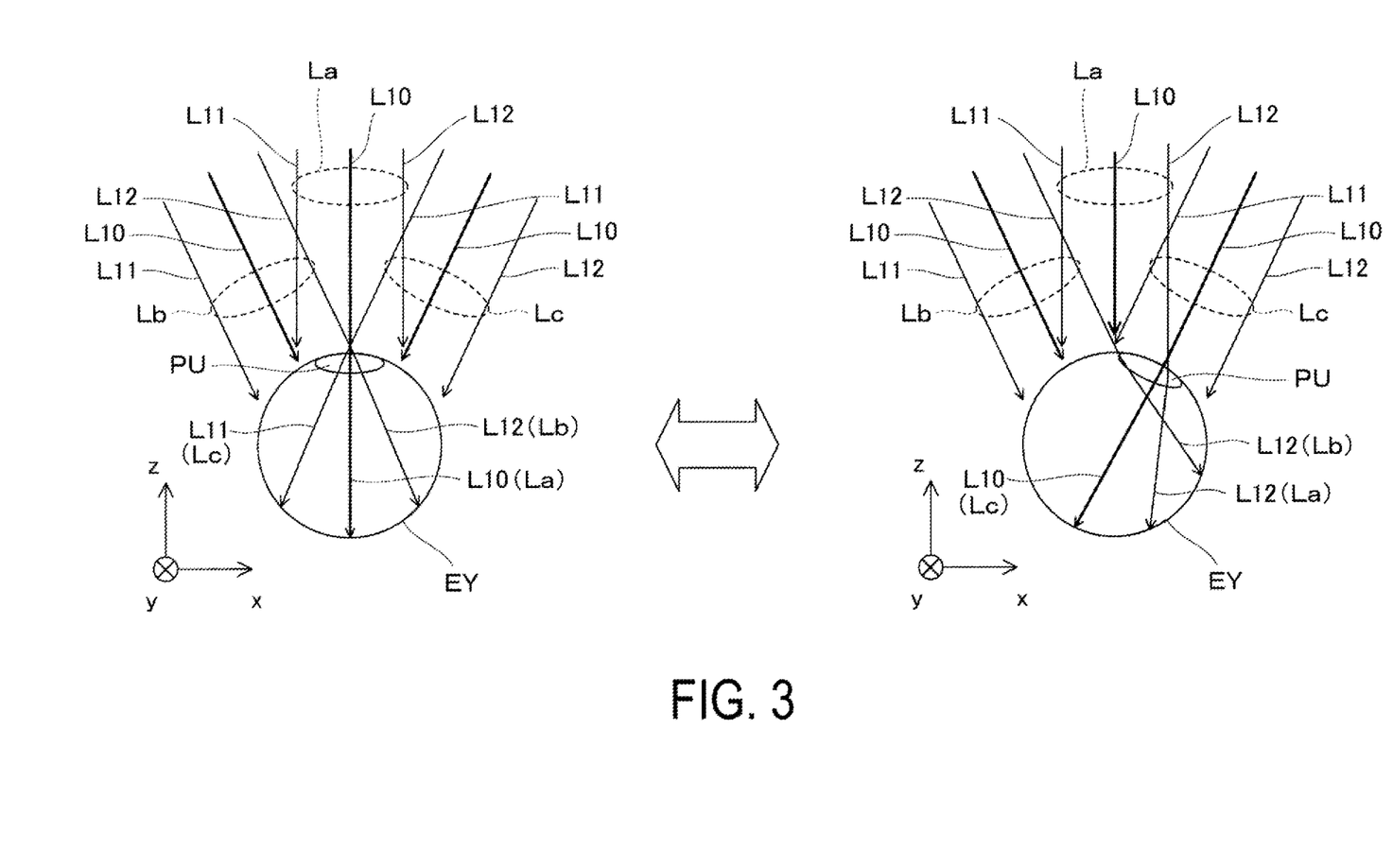
FIG. 3 is a cross-sectional view illustrating a function of the diffusion element viewed in an upper-lower direction.

A left half portion of FIG. 3 illustrates a case when the eye EY of the observer faces front in a z direction parallel to the optical axis AX. In this case, the pupil PU of the eye EY receives the first emission light L10 derived from the beam La in a central direction along the optical axis AX, i.e., from a center of the diffusion element 40 in FIG. 1, the right-hand side second emission light L12 derived from the beam Lb in a left direction, i.e., inclined from a left edge of the diffusion element 40 in FIG. 1, and the left-hand side second emission light L11 derived from the beam Lc in a right direction, i.e., inclined from a right edge of the diffusion element 40 in FIG. 1. The first emission light L10 derived from the beam La, the second emission light L12 derived from the beam Lb, and the second emission light L11 derived from the beam Lc are beams narrow enough for achieving a Maxwellian view, compared with the pupil diameter D. Therefore, even when the eye EY of the observer has abnormality (specifically, short sight, long sight, astigma, or conical cornea, for example), a high quality image can be presented. The second emission lights L11 and L12 derived from the beam La, the first emission light L10 and the second emission light L11 derived from the beam Lb, and the first emission light L10 and the second emission light L12 derived from the beam Lc are discrete beams that are separated at a predetermined gap or greater from a beam entering into the pupil PU, that enter into areas other than the pupil PU, and that are not observed.

A right half portion of the FIG. 3 illustrates a case when the eye EY of the observer looks to the right (in +x). In this case, the pupil PU of the eye EY receives the right-hand side second emission light L12 derived from the beam La in the central direction along the optical axis AX, i.e., from the center of the diffusion element 40 in FIG. 1, the right-hand side second emission light L12 derived from the beam Lb in the left direction, i.e., inclined from the left edge of the diffusion element 40 in FIG. 1, the first emission light L10 derived from the beam Lc in the right direction, i.e., inclined from the right edge of the diffusion element 40 in FIG. 1. The second emission light L12 derived from the beam La, the second emission light L12 derived from the beam Lb, and the first emission light L10 derived from the beam Lc are beams narrow enough for achieving a Maxwellian view, compared with the pupil diameter D. Therefore, even when the eye EY of the observer has abnormality, a high quality image can be presented. The emission lights L10 and L11 derived from the beam La, the emission lights L10 and L11 derived from the beam Lb, and the emission lights L11 and L12 derived from the beam Lc are discrete beams that are separated at a predetermined gap or greater from a beam entering into the pupil PU, that enter into areas other than the pupil PU, and that are not observed.

Although a description of a case when the eye EY of the observer moves to the left, i.e., in −x, is omitted, the case can be achieved when an incident state of emission light illustrated in the right portion of the FIG. 3 is laterally inversed. That is, one of beams of three emission lights obtained by dividing the beams La, Lb, and Lc enters into the pupil PU of the eye EY.

Although the case when the eye EY of the observer moves in a horizontal direction has been described above, even when the eye EY moves in a vertical direction, one of beams of three emission lights obtained by dividing the beam L1 in a discrete manner in the vertical direction can enter into the pupil PU, regardless of a direction of the eye EY, as described above.

In the virtual image display apparatus 100 according to the first exemplary embodiment described above, the diffusion element separates light from the scanner 30 into the first emission light L10 used as a reference, and the second emission lights L11, L12, L13, and L14 each having the separation angle θ greater than the capturing angle ρ corresponding to an inclination of light toward the predetermined pupil radius PR relative to the first emission light L10 at an emission position of light from the diffusion element 40, and then emits the first emission light L10 and the second emission lights L11, L12, L13, and L14. Therefore, the first emission light L10 and the second emission lights L11, L12, L13, and L14 can be prevented from entering together into the pupil PU. At the same time even when a direction of the eye EY changes greatly to an extent that original emission light is emitted toward the outside of the pupil, allowing either of the first emission light L10 and the second emission lights L11, L12, L13, and L14 to enter into the pupil PU can be easily ensured.

Second Exemplary Embodiment

Below, a virtual image display apparatus according to a second exemplary embodiment will be described. The virtual image display apparatus according the exemplary embodiment is obtained by modifying the virtual image display apparatus according to the first exemplary embodiment, and description on common points with the first exemplary embodiment is omitted.

Figure 4A:
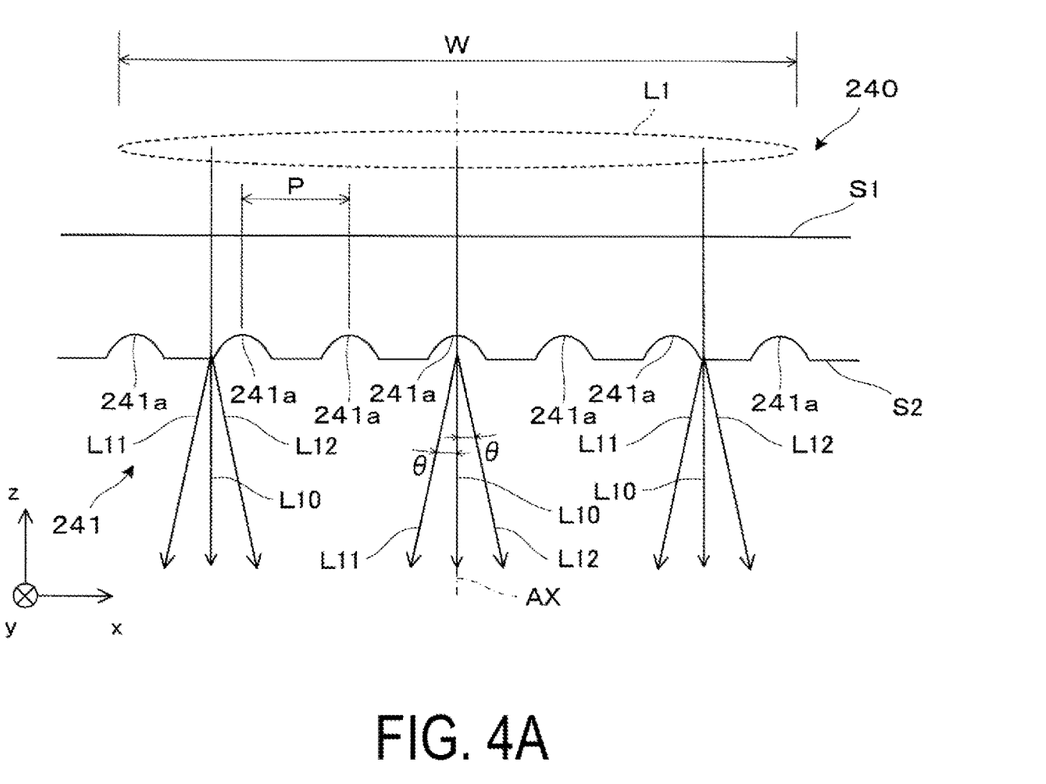
FIG. 4A is a partially enlarged cross-sectional view of a diffusion element of a virtual image display apparatus according to a second exemplary embodiment.

FIG. 4A is a view illustrating a main part of the virtual image display apparatus 100 according to the second exemplary embodiment. In the virtual image display apparatus 100 according to the second exemplary embodiment, a diffraction type diffusion element 240 is used, instead of the refraction type diffusion element 40 illustrated in FIG. 2A, for example. The diffusion element 240 has a first periodic structure 241 on the second face S2. The first periodic structure 241 includes a plurality of diffraction grooves 241a that are a plurality of slits repeated at the predetermined pitch P in the horizontal x direction. The first periodic structure 241 is configured to diffract the beam L1 passed through the first face S1 in the x direction and form the pair of discrete second emission lights L11 and L12 divided in the x direction. The first emission light L10 represents zero-order light, whereas the second emission lights L11 and L12 are first-order lights or first-order diffraction lights. The diffraction grooves 241a are not limited to grooves having a U-shaped cross-section as illustrated, but may have any kind of cross-section, such as a blazed type.

Figure 4B:
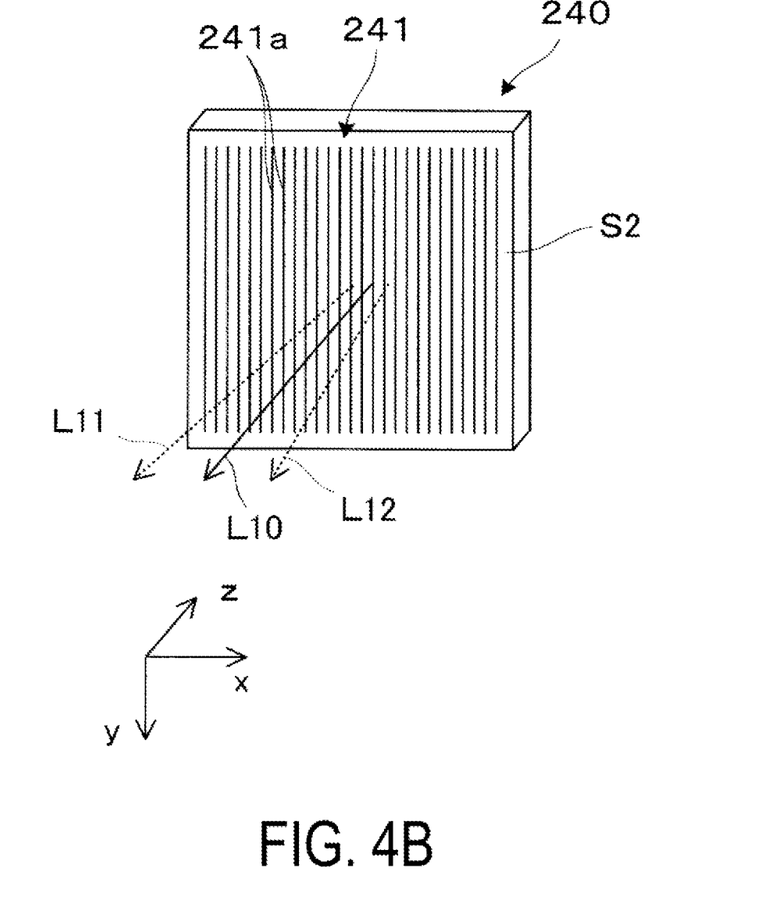
FIG. 4B is a perspective view of the diffusion element viewed from a second face.

FIG. 4B is a conceptual diagram illustrating a state of the second face S2 of the diffusion element 240. The plurality of diffraction grooves 241a that are the plurality of slits configuring the first periodic structure 241 extend in the vertical y direction and periodically arrayed in the horizontal x direction. As for the separation angle θ of the second emission lights L11 and L12 relative to the first emission light L10 used as a reference, when a density within 1 mm of the diffraction grooves 241a or the slits or a number of the slits is designated as N (1/mm), and a wavelength of the beam L1 is designated as λ (mm), a relationship of sin(θ)=Nλ is satisfied. Therefore, by appropriately adjusting the values N and λ, the separation angle θ of each of the second emission lights L11 and L12 can be set to a desired value. Table 1 below lists the separation angles θ achieved by the diffraction type diffusion element 240.

TABLE 1

| Density N [/mm] | Wavelength λ [mm] | Incident angle [°] | Separation angle θ (primary diffraction angle) [°] |
| --- | --- | --- | --- |
| 250 | 0.00055 | 0 | −7.9 |
| 333 | 0.00055 | 0 | −10.6 |
| 500 | 0.00055 | 0 | −16.0 |
| 1000 | 0.00055 | 0 | −33.4 |
| 1429 | 0.00055 | 0 | −51.8 |
| 1667 | 0.00055 | 0 | −66.4 |

As for the separation angle θ of each of the second emission lights L11 and L12 relative to the first emission light L10, in the equation (1) according to the first exemplary embodiment, $F \tan \theta = FN\lambda/\sqrt{1-(N\lambda)^2}$ is satisfied. Therefore, the following relationship is satisfied:

$$0.6D < FN\lambda/\sqrt{1-(N\lambda)^2} < 1.2D \quad (1)'$$

Table 2 below lists values corresponding to the relationship described above with respect to a specific example of the virtual image display apparatus 100 according to the second exemplary embodiment. The focal distance F of the imagery optical system 60, the density N of the diffraction grooves 241a, the wavelength λ of the beam L1, and the pupil diameter D are used as variables, and values of 0.6D, $FN\lambda/\sqrt{1-(N\lambda)^2}$, and 1.2D were evaluated.

TABLE 2

| Focal distance [mm] | Density N [/mm] | Wavelength λ [mm] | Pupil diameter D [mm] | 0.6D [mm] | $N\lambda/\sqrt{1-(N\lambda)^2}$ [mm] | 1.2D [mm] |
| --- | --- | --- | --- | --- | --- | --- |
| 15 | 350 | 0.00055 | 3 | 1.8 | 2.943 | 3.6 |
| 15 | 350 | 0.00045 | 3 | 1.8 | 2.392 | 3.6 |
| 15 | 350 | 0.00063 | 3 | 1.8 | 3.391 | 3.6 |

As can be seen from Table 2, the virtual image display apparatus 100 satisfying the relationship (1)' is achieved.

Figure 4C:
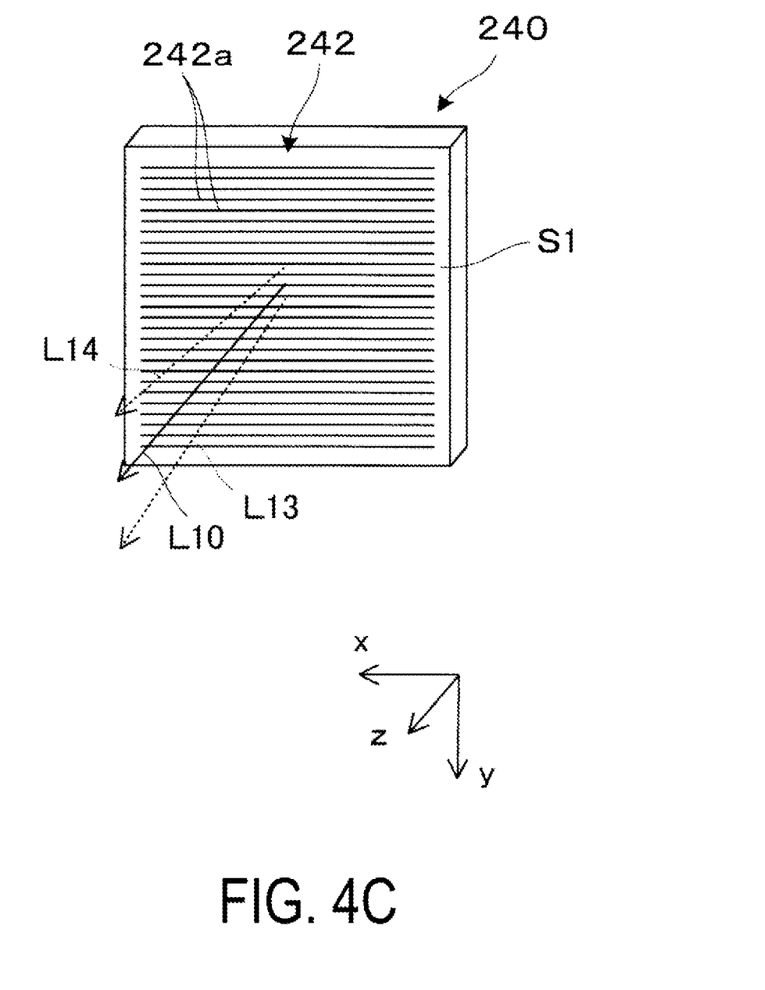
FIG. 4C is a perspective view of the diffusion element viewed from a first face.

FIG. 4C is a conceptual diagram illustrating a state of the first face S1 of the diffusion element 240. A second periodic structure 242 is formed on the first face S1 of the diffusion element 240. The second periodic structure 242 is similar to the first periodic structure 241 illustrated in FIG. 4A, and includes a plurality of diffraction grooves 242a that are a plurality of slits repeated at the predetermined pitch P in the vertical y direction. The second periodic structure 242 is configured to diffract the beam L1 in the y direction and form the pair of discrete second emission lights L13 and L14 divided in the y direction. Even in this case, as for the separation angle θ of each of the second emission lights L13 and L14 relative to the first emission light L10 used as a reference, when a density within 1 mm of the diffraction grooves 241a or the slits or the number of the slits is designated as N (1/mm), and a wavelength of the beam L1 is designated as λ (mm), a relationship of sin(θ)=Nλ is satisfied. Therefore, by appropriately adjusting the values N and λ, the separation angle θ of each of the second emission lights L13 and L14 can be set to a desired value.

Even in the virtual image display apparatus 100 according to the second exemplary embodiment, the first emission light L10 and the second emission lights L11, L12, L13, and L14 can be obtained by dividing the beams La to Lc. As described with reference to FIG. 3 in the first exemplary embodiment, even when the eye EY of the observer moves to the left or right, for example, one of beams of three discrete emission lights obtained by dividing the beams La, Lb, and Lc enters into the pupil PU of the eye EY.

Third Exemplary Embodiment

Below, a virtual image display apparatus according to a third exemplary embodiment will be described. The virtual image display apparatus according the exemplary embodiment is obtained by modifying the virtual image display apparatus according to the first exemplary embodiment, and description on common points with the first exemplary embodiment is omitted.

Figure 5:
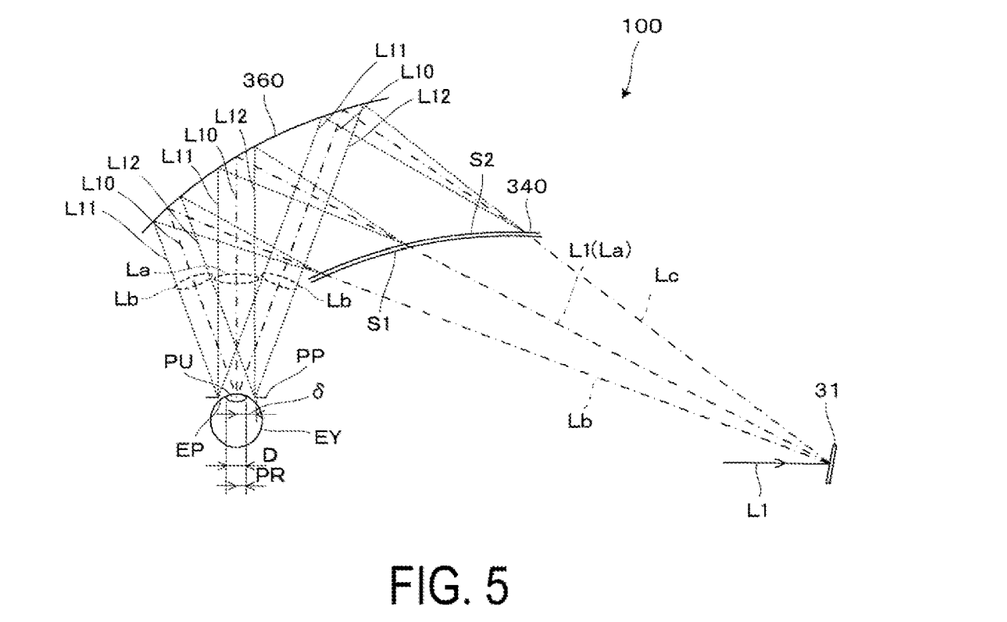
FIG. 5 is a schematic cross-sectional view illustrating a virtual image display apparatus according to a third exemplary embodiment.

FIG. 5 is a view illustrating a virtual image display apparatus 100 according to the third exemplary embodiment. In this case, an imagery optical system 360 serving as an exit pupil forming unit does not include a lens, but includes an off-axis mirror, and, as a diffusion element 340, a curved diffusion plate made from a curved plate is used. The imagery optical system 360 is an off-axis ellipse mirror, for example, and the diffusion element 340 is a curved plate body having a free curved surface or an aspherical surface, for example. Base surfaces of the diffusion element 340, i.e., the first face S1 and the second face S2, are applied with structure films configured to divide light in a discrete manner. The structure films are achieved by forming, in a three-dimensional manner through a technology of nano-imprinting, for example, the refraction type periodic structures 41 and 42 illustrated in FIG. 2A, for example, or the diffraction type periodic structures 241 and 242 illustrated in FIG. 4A, for example, on surface layers of films.

The imagery optical system 360 may be a translucent mirror. In this case, an external scene image can be observed in a see-through manner.

Modification Examples and Others

The disclosure is described according to the above-mentioned exemplary embodiments, but the disclosure is not limited to the above-mentioned exemplary embodiments. The disclosure may be carried out in various modes without departing from the gist of the disclosure, and, for example, the following modifications may be carried out.

Figure 6A:
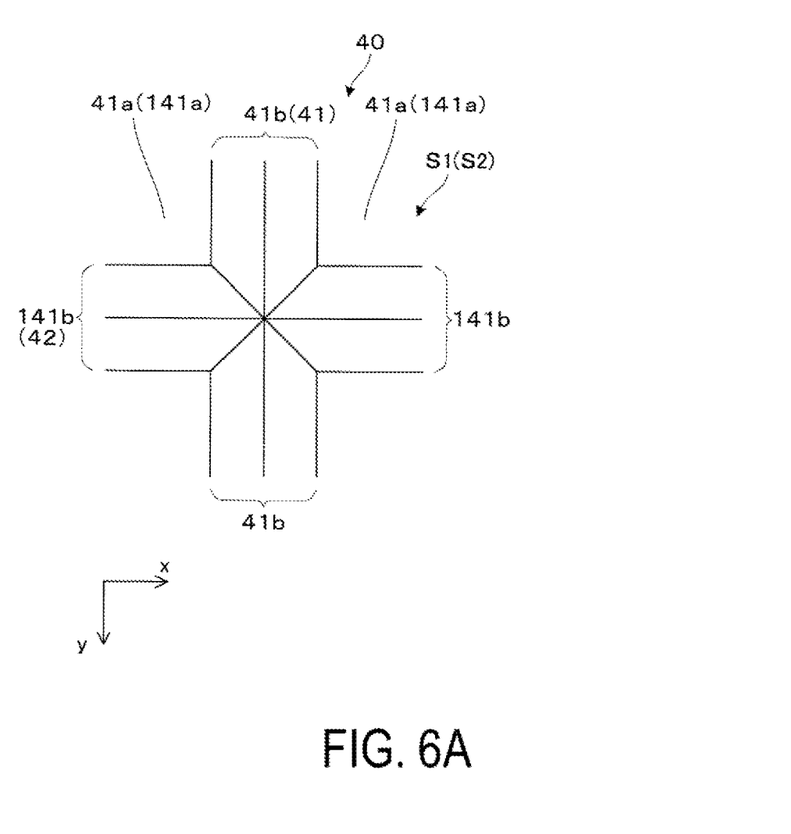
FIG. 6A is a partially enlarged front view illustrating a diffusion element according to a modification example.
Figure 6B:
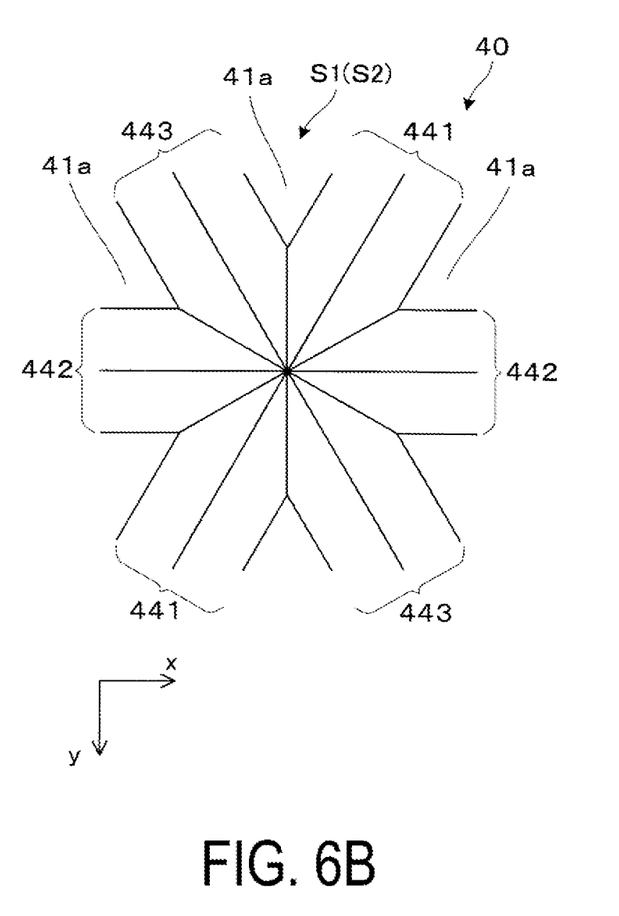
FIG. 6B is a partially enlarged front view illustrating a diffusion element according to another modification example.

For example, in the virtual image display apparatuses 100 according to the exemplary embodiments described above, the first periodic structure 41 is provided on the second face S2 of the diffusion element 40, whereas the second periodic structure 42 is provided on the first face S1. However, as illustrated in FIG. 6A, for example, the inclined portions 41b and 141b of the first and second periodic structures 41 and 42 may be collectively provided on the first face S1 or the second face S2 of the diffusion element 40. As illustrated in FIG. 6B, for example, the three kinds of periodic structures 441, 442, and 443 may be provided on the first face S1 or the second face S2. In this case, an array direction in a periodic structure changes per 60°, instead of 90°, allowing the separation angle θ to be easily set when a pupil is moved diagonally upward. The array direction of the periodic structure may not be changed per 60°, but may be changed per 45°, for example. The refraction type diffusion element 40 has been described with reference to the accompanied drawings. Even in the diffraction type diffusion element 240, the diffraction grooves 241a and 242a of the first and second periodic structures 241 and 242 may be collectively provided on the first face S1 or the second face S2.

In the exemplary embodiments described above, the first periodic structures 41 and 241 are provided on the second faces S2 of the diffusion elements 40 and 240, whereas the second periodic structures 42 and 242 are provided on the first faces S1. Instead of this, such a diffusion element may be used that is arranged, in an overlapped manner, with a first diffusion element member having a surface provided with the first periodic structure 41 or 241 and another surface that is a flat surface, and a second diffusion element member having a surface provided with the second periodic structure 42 or 242 and another surface that is a flat surface. Further, without using both of the single-surface type first and second diffusion element members as described above, either of the single-surface type first diffusion element member and the single-surface type second diffusion element member may be only provided as a diffusion element.

The imagery optical systems 60 and 360 may each be a combination of a lens and a mirror or a combination of a plurality of mirrors. Mirrors and lenses may be Fresnel mirrors and Fresnel lenses, for example. Further, the imagery optical systems 60 and 360 may be optical systems using light-guiding members. In this case, a refractive surface and a reflective surface may be incorporated on a surface of or in the light-guiding body.

As described above, the virtual image display apparatuses 100 are each attached to either a right eye or a left eye. However, a pair of the display devices illustrated in FIG. 1, for example, corresponding to both of the right eye and the left eye may be provided to achieve a virtual image display apparatus for both eyes.

The virtual image display apparatuses 100 are thought to be used as head-mounted displays, but are applicable to head-up displays, binocular type hand-held displays, and the like.

What is claimed is:

1. A virtual image display apparatus comprising:
   a laser light source;
   a scanner configured to scan light from the laser light source and form an intermediate image;
   a diffusion element arranged at a position of the intermediate image formed by the scanner; and
   an exit pupil forming unit configured to cause light that has passed through the diffusion element to be incident on a position of an exit pupil,
   wherein the diffusion element separates the light from the scanner into first emission light used as a reference, and second emission light having a separation angle, which is greater than a capturing angle corresponding to an inclination of light toward a predetermined pupil radius, relative to the first emission light at an emission position of the light from the diffusion element, and then emits the first emission light and the second emission light, and
   the diffusion element has a periodic structure in which first surfaces extending along the position of the intermediate image and forming the first emission light, and second surfaces respectively inclined at a predetermined angle or greater relative to the first surfaces and forming the second emission light are repeatedly arranged.

2. The virtual image display apparatus according to claim 1, wherein the diffusion element is a diffraction grating configured to emit the first emission light as zero-order light and the second emission light as first-order light.

3. The virtual image display apparatus according to claim 1, wherein the following relationship is satisfied:

$$0.6D < F \tan \theta < 1.2D,$$

where θ is the separation angle of the second emission light relative to the first emission light, D is a pupil diameter, and F is a focal distance of the exit pupil forming unit.

4. The virtual image display apparatus according to claim 3, wherein
the diffusion element is a diffraction grating configured to emit the first emission light as zero-order light and the second emission light as first-order light, and
the following relationship is satisfied:

$$0.6D < FN\lambda/\sqrt{1-(N\lambda)^2} < 1.2D,$$

where N is the number of slits per unit length of the diffraction grating, and $\lambda$ is a wavelength of the light from the laser light source.

5. The virtual image display apparatus according to claim$ wherein the following relationship is satisfied;

$$P < 0.5W,$$

where W is a diameter of a beam at the diffusion element, and P is a pitch in the periodic structure of the diffusion element.

6. A virtual image display apparatus comprising:
a laser light source;
a scanner configured to scan light from the laser light source and form an intermediate image;
a diffusion element arranged at a position of the intermediate image formed by the scanner; and
an exit pupil forming unit configured to cause light that has passed through the diffusion element to be incident on a position of an exit pupil,
wherein the diffusion element separates the light from the scanner into first emission light used as a reference, and second emission light having a separation angle, which is greater than a capturing angle corresponding to an inclination of light toward a predetermined pupil radius, relative to the first emission light at an emission position of the light from the diffusion element, and then emits the first emission light and the second emission light, and
the following relationship is satisfied:

$$0.6D < F \tan \theta < 1.2D,$$

where $\theta$ is the separation angle of the second emission light relative to the first emission light, D is a pupil diameter, and F is a focal distance of the exit pupil forming unit.

7. The virtual image display apparatus according to claim 6, wherein
the diffusion element is a diffraction grating configured to emit the first emission light as zero-order light and the second emission light as first-order light, and
the following relationship is satisfied:

$$0.6D < FN\lambda/\sqrt{1-(N\lambda)^2} < 1.2D,$$

where N is the number of slits per unit length of the diffraction grating, and $\lambda$ is a wavelength of the light from the laser light source.

\* \* \* \* \*